May 12, 1964
P. F. ROYET
3,132,601
AUTOMATIC DIAPHRAGM FOR PHOTOGRAPHIC
AND KINEMATOGRAPHIC CAMERAS
Filed March 26, 1962
6 Sheets-Sheet 1
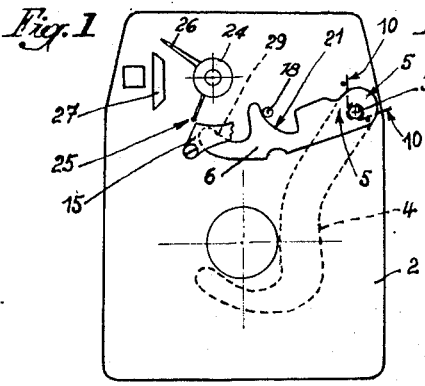
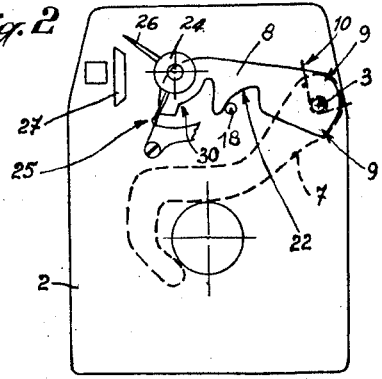
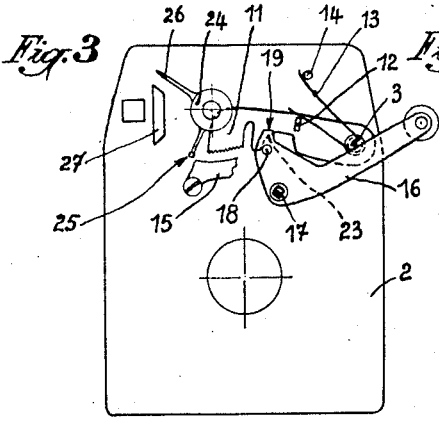
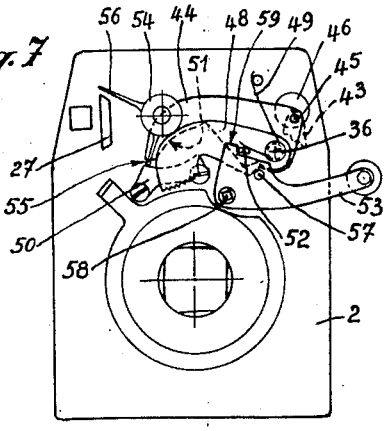
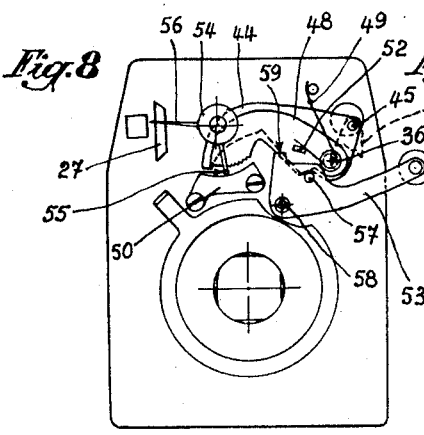
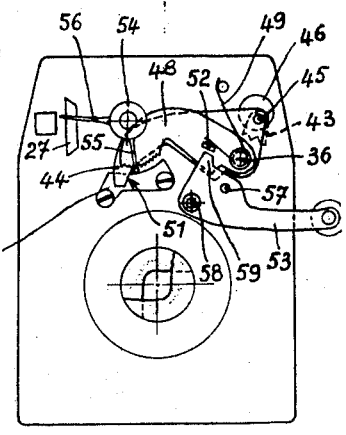
INVENTOR
PAUL FERDINAND ROYET
BY
ATTORNEY May 12, 1964  P. F. ROYET  3,132,601
AUTOMATIC DIAPHRAGM FOR PHOTOGRAPHIC
AND KINEMATOGRAPHIC CAMERAS
Filed March 26, 1962  6 Sheets-Sheet 2
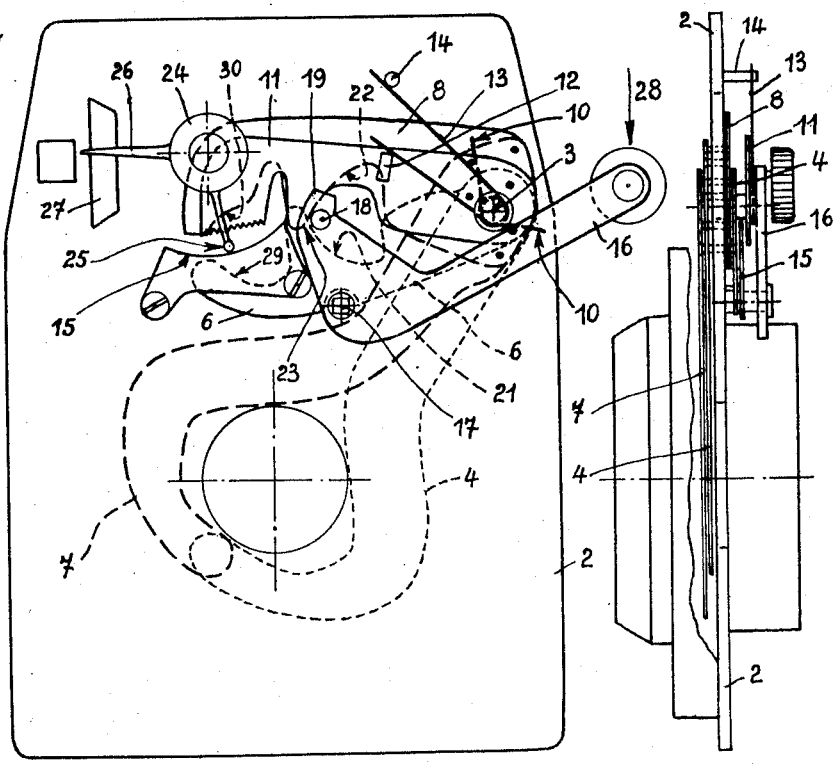
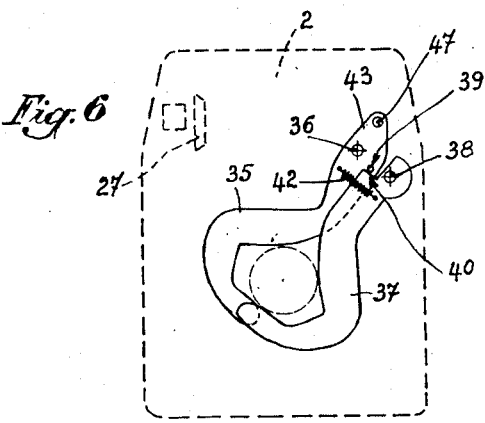
INVENTOR
PAUL FERDINAND ROYET
BY
ATTORNEY May 12, 1964 P. F. ROYET 3,132,601
AUTOMATIC DIAPHRAGM FOR PHOTOGRAPHIC
AND KINEMATOGRAPHIC CAMERAS
Filed March 26, 1962 6 Sheets-Sheet 3
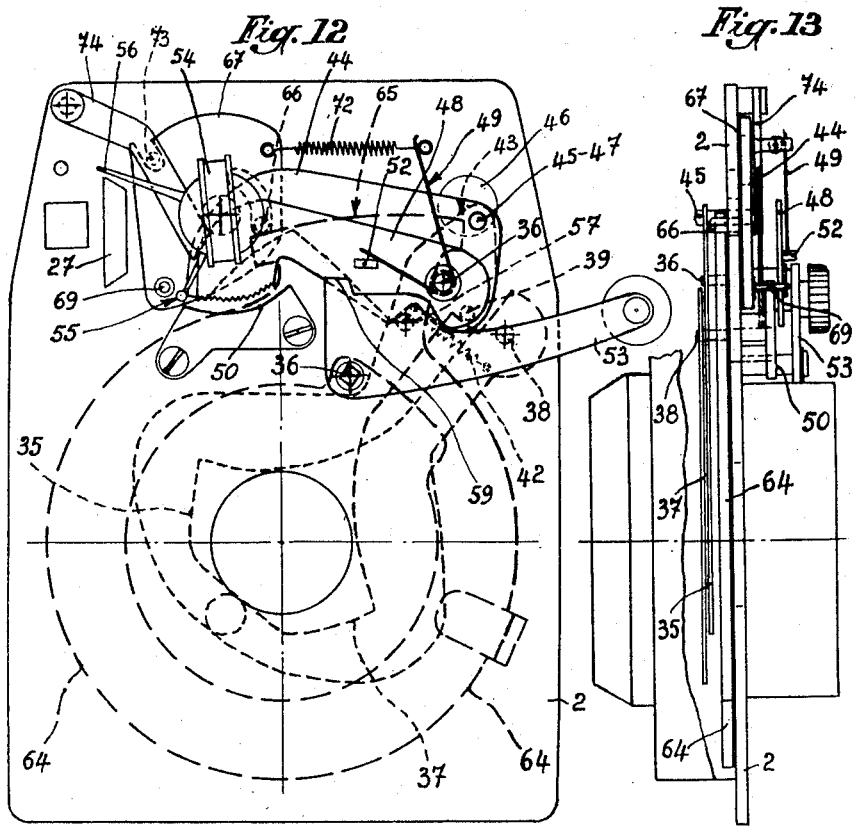
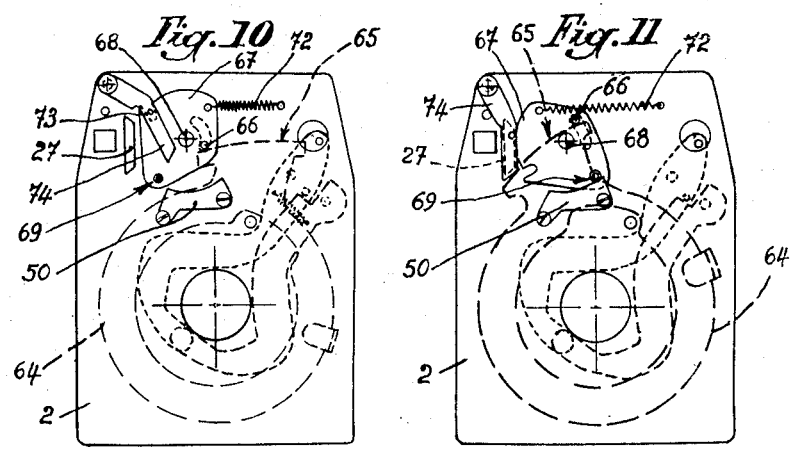
INVENTOR
PAUL FERDINAND ROYET
BY *Irwin S. Thompson*
ATTORNEY

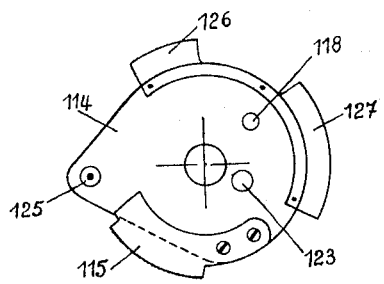
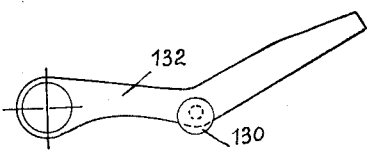
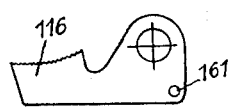
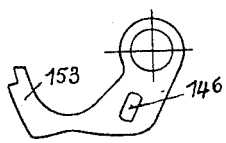
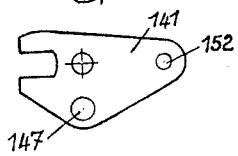
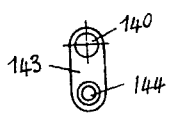
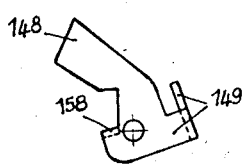
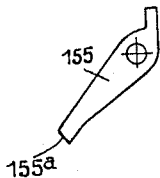
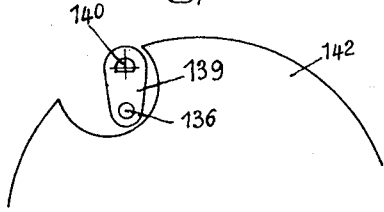
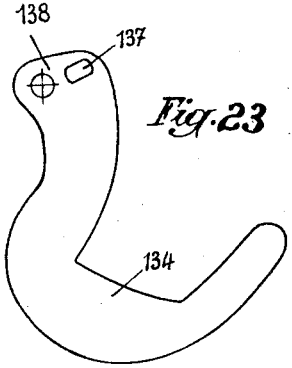

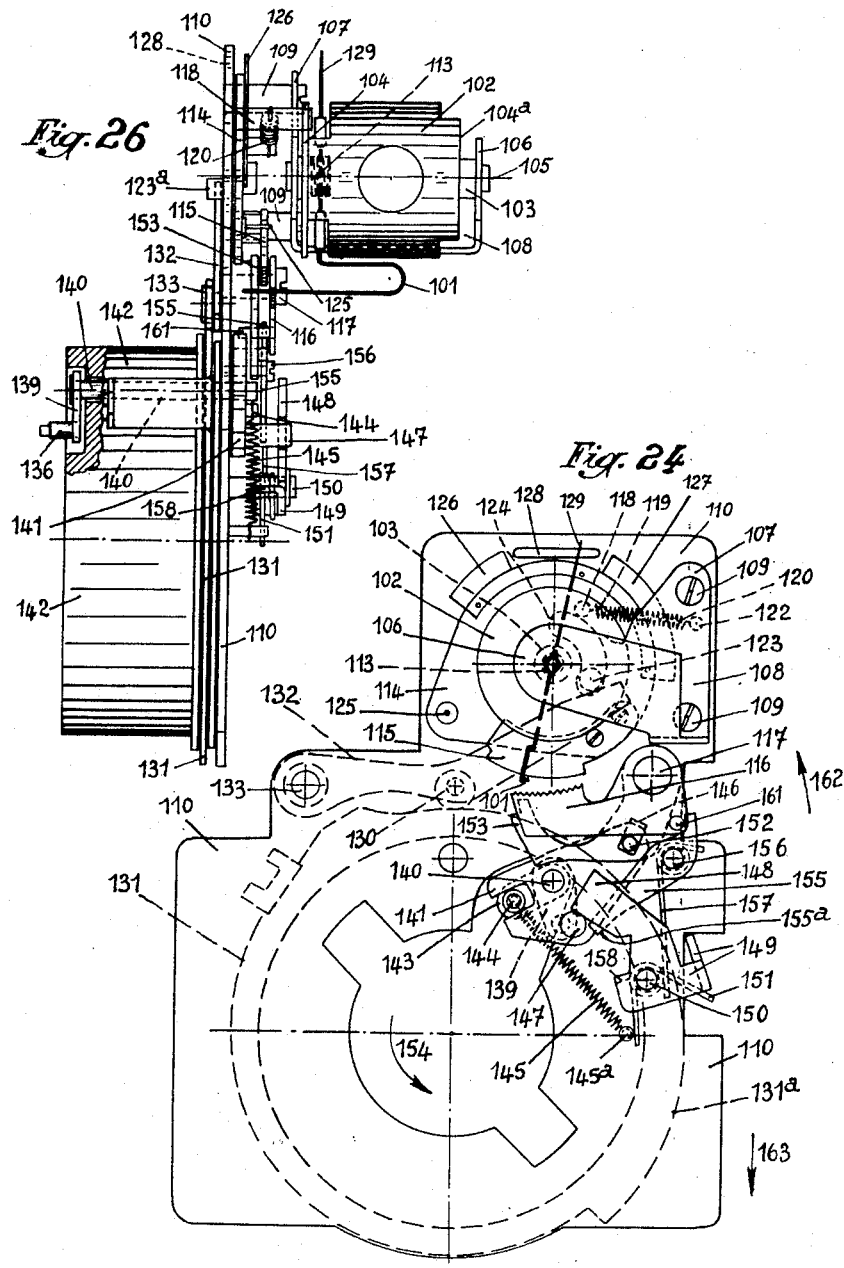

May 12, 1964
P. F. ROYET
3,132,601
AUTOMATIC DIAPHRAGM FOR PHOTOGRAPHIC
AND KINEMATOGRAPHIC CAMERAS
Filed March 26, 1962
6 Sheets-Sheet 6
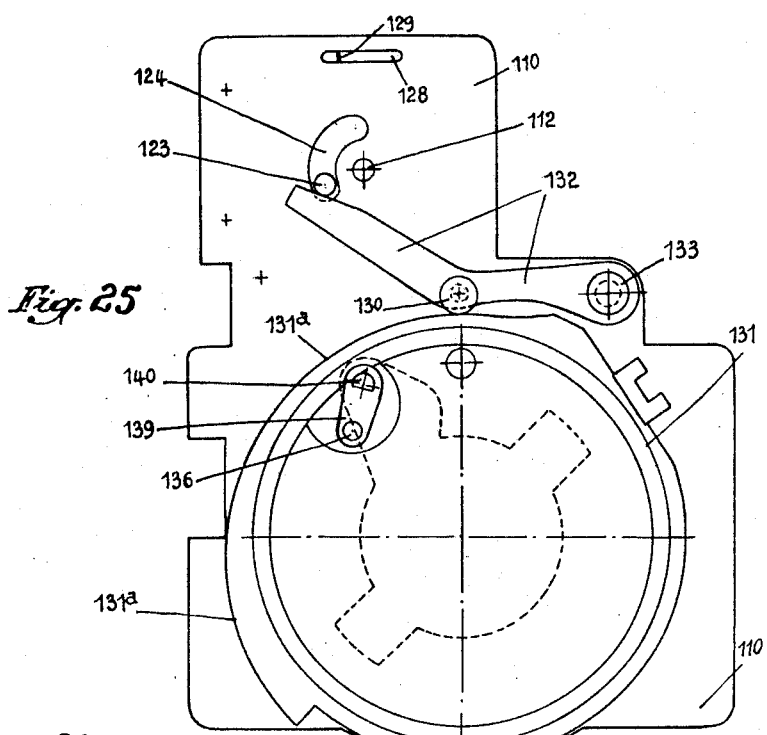
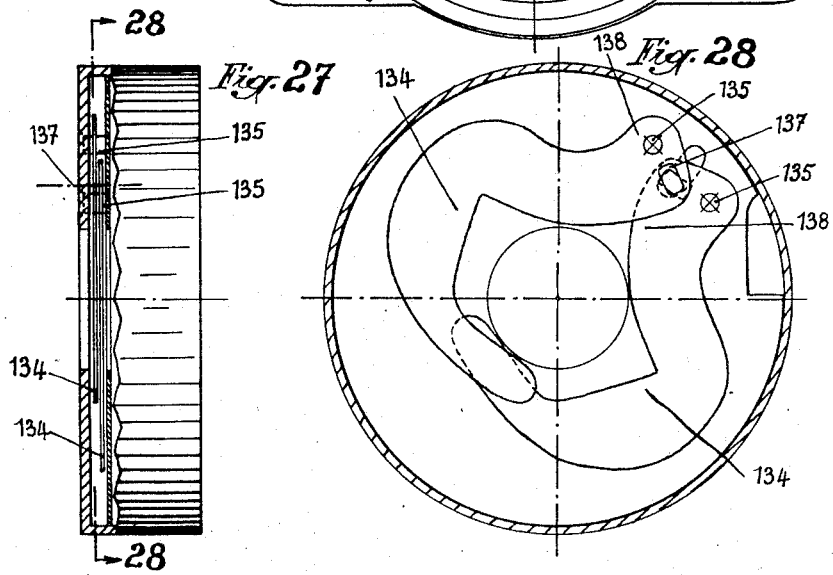
INVENTOR
PAUL FERDINAND ROYET
BY
ATTORNEY

3,132,601
AUTOMATIC DIAPHRAGM FOR PHOTOGRAPHIC AND KINEMATOGRAPHIC CAMERAS

Paul Ferdinand Royet, 14 Rue Michel Rondet, Saint Etienne, Loire, France
Filed Mar. 26, 1962, Ser. No. 182,300
Claims priority, application France Mar. 27, 1961
6 Claims. (Cl. 95—10)

Diaphragm controlling means are well-known for photographic and kinematographic apparatus, which controlling means are provided with an automatic control system operated by a light measuring instrument and acting on two vane or leaf members forming the movable diaphragm, said leaf members overlapping partly while each of them is provided, along its inner edge with a cut, so that the cross-section of the opening provided by the diaphragm, as formed by the two cuts, depends on the spacing of the overlapping leaf members. Said opening is held in its condition of maximum breadth when inoperative, under the action of a spacing member acting against a spring which urges the leaf members into a closed position, whereas when taking a view the spacing member is removed so that the diaphragm leaf members may then reduce their spacing down to a position which is defined by a movable stop controlled by the means measuring the illumination, as a function of the intensity of illumination of the object to be photographed.

My invention has for its object improvements in the arrangement of the tailpieces of the diaphragm leaf members, of a notched locking blade adapted to prevent any sliding of the movable stop when it is engaged by the tailpieces of the diaphragm leaf members, of a bolt locking the release of the leaf members in the case of insufficient or excessive light, and of a disconnecting member for the automatic means with a view to allowing manual adjustment of the opening of the diaphragm.

In a preferred embodiment of my invention:

Each leaf member, which defines the opening of the diaphragm, is rigid with a coaxial blade acting as a tailpiece and adapted to engage the feeler, the position of which defines the opening of the diaphragm, A locking blade, provided with a notched contacting wall and engaging the feeler, so as to hold it fast in a position governed by the indications of a light measuring instrument before the actual feeling of the blade by the tailpieces of the diaphragm leaf members, A member controlled by the notched blade, adapted to lock the releasing lever against movement when the presence of the feeler does not make it collapse, The operation of the manual control of the diaphragm inserts, underneath the notched feeler blade, a further feeler opposing the locking of the releasing lever and a mask concealing the opening through which the finder hand is adapted to appear.

The possibility of taking a photograph is governed by the sensitivity of the emulsion covering the film or the plate, by the speed of the shutter, the extent of opening of the diaphragm, and it may occur that the range of the scale of possible diaphragm openings, is not sufficiently broad between excess and lack of light. This drawback is removed by changing the sensitivity of the film but in such a case, it may occur that the feeler extending outside the notched locking blade, may be set in a position which does not allow the release of the bolt adapted to lock the releasing lever.

According to a modified embodiment, the automatic opening of the diaphragm as a function of the speed selected and of the emulsion used at the moment of the release, is obtained by shifting in either direction, the angular position of the light measuring instrument when inoperative, and at the same time the position of the means locking the releasing lever extending to either side of the scale of useful diaphragm openings.

Thus, it is possible to increase for an apparatus of the type referred to, the area inside which the automatic control means for the diaphragm may be used.

I have illustrated, by way of example, in the accompanying drawings, various embodiments of my improved automatic diaphragm. In said drawings:

FIGS. 1 and 2 are front views showing independently and to either side of a carrier plate, respectively each of the two diaphragm leaf members and associated tailpieces, FIG. 3 is a front view showing the locking blade and the releasing lever, FIGS. 4 and 5 are, on a larger scale, front and side views of the assembly of the various parts, illustrated separately in FIGS. 1 to 3, FIG. 6 is a front view showing the position with reference to the carrier plate which is not illustrated of the two diaphragm leaf members, in their position of maximum opening, FIGS. 7, 8 and 9 are front views showing on said carrier plate, the adjusting blade, the locking blade, the releasing lever, respectively in its locking position and when ready to operate after release, the diaphragm leaf members being located on the other side of the plate, FIGS. 10 and 11 are front views showing on the plate said parts respectively before and after disconnection of the automatic system with a view to manually adjusting the diaphragm, FIGS. 12 and 13 show on a larger scale, respectively front and side views of the assembly of the various parts illustrated separately in FIGS. 7 to 11, FIGS. 14 to 23 are plan views of structural parts shown singly and corresponding to a modified embodiment, to wit:

FIG. 14 shows the support of the galvanometer,

FIG. 15 shows the lever controlling the angular setting of said support,

FIG. 16 shows the notched locking blade holding fast the galvanometer hand,

FIG. 17 shows the blade adapted to adjust the galvanometer hand,

FIG. 18 shows the rocking sector controlling the leaf members of the diaphragm,

FIG. 19 shows the releasing lever with its tailpiece,

FIG. 20 shows the rocking locking stop provided for said lever,

FIGS. 21 and 22 show the levers transmitting to the diaphragm leaf members, closing and opening pulses according to the position of the feeler, FIG. 23 shows a diaphragm leaf member.

FIGS. 24 and 25 show the rear and front surfaces respectively, of the plate which carries the galvanometer and the members controlling the diaphragm leaf members, FIG. 26 is a side view of said plate, FIGS. 27 and 28 shows the diaphragm leaf members respectively in side and front views, partly cross-sectionally through line 28—28 of FIG. 27.

In order to reduce longitudinally the bulk of the diaphragm leaf members, an element rigid with each of them is fitted in a similar direction with reference to its pivot, so as to act as a tailpiece.

In FIG. 1, the plate 2 is provided with a single pivot 3 on which are secured two leaf members of which only the leaf member 4 is illustrated. Through the stays 5, said leaf member is rigidly secured to the lever 6 which acts as a tailpiece and which is separated from the lever by the thickness of the plate 2.

In FIG. 2, the same plate 2 is illustrated, said plate carrying the second leaf member 7 rocking round the same pivot 3 as the leaf member 4. Said leaf member 7 also carries a lever 8 acting as a tailpiece and is separated from the lever by the plate 2. Stays 9 make the leaf member 7 rigid with the lever or tailpiece 8.

A spring 10, bearing at one end against one of the stays 5 of the leaf member 4 and through its other end against one of the stays 9 of the leaf member 7, urges said leaf members towards each other so that they may define together an opening of a minimum size.

FIG. 3 shows positioned on the plate 2 the notched locking blade 11 fitted on the same pivot 3 as the leaf members 4 and 7, which are not shown on said figure, since they are located on the opposite side of the plate 2. Said blade 11 is provided with a stop 12. Under the action of a spring 13 engaging at one end said stop 12, while its other end engages a stationary point 14 on the plate 2, said blade 11 has a tendency to rock around the pivot 3 so as to move downwardly towards the bearing sector 15.

The releasing lever 16 for the diaphragm leaf members includes a projection 18 and a nose 19.

When inoperative, the lever 16 sets the projection 18 in a position such that it is in contact with the slopes formed on the tailpieces 21 and 22 of the cooperating leaf members 4 and 7 (FIGS. 1 and 2), and also in contact with the slope 23 of the notched blade 11 (FIG. 3). The leaf members are then held in their position of maximum opening and the notched blade 11, raised with reference to the bearing sector 15, allows a free passage so that the movable adjustment stops may be positioned.

Also, in each of FIGS. 1 to 4, is illustrated at 24 the galvanometer of the light measuring instrument which includes a feeler hand 25 adapted to move between the bearing sector 15 and the notches of the blade 11, and a further hand or finder hand 26 which can be viewed through the gate 27 formed in the plate 2 so as to show the operator that conditions are satisfactory for view taking.

Thus, superposed over the pivot 3, on the plate 2, are:
On the rear surface, the leaf 7 and the leaf 4,
On the front surface, the tailpiece 6, the tailpiece 8 and the notched blade 11.

The releasing lever 16 fitted over all said parts is rigid with a shaft 17, forming its pivot and which controls the release of the diaphragm leaf members.

At the moment of a view taking, and under the action of light, the galvanometer 24 (FIG. 4) sets the feeler hand 25 in the gap separating the bearing sector 15 from the notched blade 11. At the same time, the finder hand 26 appears through the gate 27.

The operation of said system of parts is as follows:

By acting on the releasing lever 16 in the direction of the arrow 28 and at the beginning of said operation, the projection 18 is shifted away from the slope 23 of the notched blade 11 and from the slopes 21 and 22 of the tailpieces 8 and 6. Said shifting away of the projection 18 releases the notched blade 11 which, under the action of the spring 13 is lowered onto the bearing sector 15 and locks thereon the feeler hand 25 so as to prevent its sliding outside the position defined by the angular setting of the galvanometer. With some lag, the stress of the spring 10 urges the tailpieces 6 and 8 of the leaf members 4 and 7 towards each other until their slopes 29 and 30 engage in their turn the feeler hand 25 so as to then produce, through the position thus impressed on the leaf members an opening of the diaphragm which depends on the outer luminosity.

The notched blade 11 being held fast by the feeler hand 25 in comparatively high position while the stop 12 remains outside the path followed by the nose 19 of the releasing lever 16; the latter may therefore now be rocked by an amount sufficient for the release of the leaf members.

In the case of an excess or insufficiency or light, the hand 26 of the galvanometer 24 no longer appears in the gate 27 because, according to the case, it lies underneath or above said gate and simultaneously, the feeler hand 25 is no longer or has not yet come between the bearing sector 15 and the notched sector of the blade 11. Consequently the lowering of the blade 11 under the action of the spring 13, brings the stop 12 into the path of the nose 19 of the lever 16. The lever 16 thus held fast against the stop 12 cannot continue being operated with a view to releasing the leaf members.

In a modification illustrated in FIGS. 6 to 13, and with a view to simplification, the diaphragm leaf members have no longer a common pivot, but different pivots.

The leaf 35 illustrated in FIG. 6, rocks around the pivot 36 and the leaf 37 rocks around the pivot 38. The leaf 35 controls the shifting of the leaf 37 through the agency of a small stud 39 engaging the slope 40 located to one side of the leaf 37. A spring 42 of which the ends are attached respectively to each of the leaf members 35 and 37 forming the diaphragm, has for its object, to make the latter overlap, so as to reduce their spacing and to close the opening constituted by the cuts formed in said members.

The leaf 37 does not include any tailpiece whereas in contradistinction, the leaf 35 is provided with a tailpiece 43 which serves for controlling the movements of the leaf members. To this end, the tailpiece is coupled with the adjusting blade 44 (FIGS. 7 and 8) located on the rear surface of the plate 2, by a stud 45 rigid therewith and extending through a port 46 formed in the plate 2, said stud being fitted in a recess 47 (FIG. 6) provided in said tail-piece 43 of the leaf 35 located on the front surface of the plate 2.

The movements of the adjusting blade 44 rocking round the pivot 36 (FIG. 7) carried by the plate 2, control thus simultaneously the movements of the leaf members 35 and 37 forming the diaphragm.

The same pivot 36 carries a rocking notched blade 48 which a spring 49 causes to pivot in the direction of the bearing sector 50.

Said notched blade 48 is also provided with a stop 52 adapted to lock the operation of the releasing lever 53 when, as disclosed hereinabove in the description of FIGS. 1 to 5, there is an excess or insufficiency of light. To the plate 2, is secured to the galvanometer 54 carrying its feeler hand 55 and its finder hand 56.

In this last embodiment, the releasing lever 53 is provided with a stud 57 against which abuts the adjusting blade when inoperative, under the action of the spring 42 (FIG. 6), while the spring 49 urges the notched blade 48 against the same stud.

When taking a view, the operator has a tendency to shift, in the direction of the arrow 28, the releasing lever 53 carried by the control shaft 58. When light is sufficient, as illustrated in FIG. 8, the feeler hand 55 is located in the gap between the bearing sector 50 and the notched blade 48. When in contact with the feeler hand 55, the notched blade 48 holds the stop 52 in a sufficiently raised position so as not to disturb the movement of the releasing lever 53. Simultaneously, the adjusting blade 44 which is coupled with the leaf 35, is lowered under the action of the spring 42 until its slope 51 (FIG. 9) engages the feeler hand 55 which is held in a locked position between the bearing sector 50 and the notched blade 48.

In contradistinction, if the luminosity is not sufficient or is too great, the notched blade 48 sinks until its stop 52 engages the path of the nose 59 of the releasing lever 53 so as to oppose the end of the operation and consequently to prevent any release of the leaf diaphragm (FIG. 7).

In the two above-described embodiments, only an automatic control of the diaphragm has been described as provided by a light measuring instrument. However, in certain cases, it may be necessary to take a view through a manual control of the opening of the diaphragm, that is, independently of the data supplied by the light measuring instrument.

To this end, means are provided for preventing temporarily operation of the automatic means whereby it is possible to release the diaphragm leaf members notwithstanding the luminosity. This latter arrangement is designed as follows:

To the front of the plate 2 is positioned a ring 64 for the manual control of the diaphragm with which is associated a slope 65 against which a spring 72 holds a stud 66 carried by a member 67 rocking round a pivot 68. Said member 67 located on the rear surface of the plate 2 carries also at a predetermined point, a further feeler hand 69 adapted to be shifted coaxially with the feeler hand 55 of the galvanometer 54, but in a manner entirely independent of the latter.

In order to show the operator that the automatic means are no longer operative, the member 67 urges when it has been caused to pivot a mask 74 through the agency of a stud 73, so as to cover the gate 27. The pivotal movement of the member 67 has set the second feeler hand 69 in the gap separating the bearing sector 50 from the notched blade 48 which is not illustrated in FIG. 11. The presence of said feeler hand 69 pushing forwardly the feeler hand 55 of the galvanometer plays the same part as the latter by holding the stop 52 at a sufficient height on the notched blade 48, so that upon taking of a view, the nose 59 of the releasing lever 53 (FIG. 12) may escape.

In the embodiment described hereinafter, I will now describe the means for executing during an inoperative period a suitable setting of the feeler hand 101 of the galvanometer 102 (FIGS. 24 and 26) according to the sensitivity of the emulsion and to the speed of the shutter, said galvanometer being controlled by the light measuring instrument. To this end, the galvanometer stator 102 carried by the two trunnions 103 rigid with its flanges 104a is adapted to pivot at 105 between the two arms 106 and 107 of a strap 108 secured at 109 to the plate 110.

On this plate 110 rocks, round a pivot 112 (FIG. 25) coaxial with the movable set 113 of the galvanometer 102, an auxiliary plate 114 (FIGS. 14 and 24) carrying the following parts:

A notched bearing sector 115 against which the notched blade 116, when rocking round the point 117, urges the hand 101 of the movable set 113 of the galvanometer 102.

A stud or projection 118, the head of which engaging the flange 104 of the galvanometer stator 102, makes the latter move with it. To said stud 118 is secured one of the ends 119 of a return spring which may however be secured at any other point of said plate 114, while its opposite end 120 is secured at 122 to the plate 110.

A projection 123, adapted to move in a port 124 of the plate 110 through which it passes and beyond which its head 123a projects.

The non-automatic feeler hand 125 which is inserted by hand in the gap separating the notched bearing sector 115 from the notched blade 116 when it is desired to render the automatic control system of the diaphragm inoperative.

The shutter or screen 126 (FIGS. 24 and 25) which is opaque or translucent and colored, which conceals the gate 128 cut in the plate 110 and through which the operator may see the hand 129 controlled by the galvanometer 102, shows said operator that the diaphragm is in an unfavorable condition of opening for view taking. When the hand 129 does not appear in said gate, the releasing means are locked. In contra-distinction, the appearance of the shutter or screen 127 shows that manual control of the diaphragm has been substituted for automatic control.

The positioning of the galvanometer as a function of the sensitivity number of the emulsion and of the speed of the diaphragm is obtained by the shifting of the cam 131 (FIG. 25) controlled by a lever such as 132, and at the periphery of which a lever 132 rocking around the point 133 is urged for engagement through a slope 131a. Said lever is held against said slope 131a on the cam 131 through the engagement against said lever of the movable stop 123 carried by the auxiliary plate 114 which may be angularly adjusted and which is urged constantly into position by the spring 119. The eccentric stud 130 in contact with the slope 131a of the cam 131 allows obtaining an accurate setting of the galvanometer.

In this last disclosed embodiment, the diaphragm includes two leaf members 134 (FIGS. 23 and 28) having the same notched outline, but overlapping each other in reversed relationship. Said leaf members may overlap by oscillating symmetrically around the corresponding pivots 135 carried by the stationary plate 110. The members overlap to a varying extent in the direction of the pulse provided by the shifting of a control projection 136 passing through the ports 137 provided in the correspond ing superposed tailpieces 138 of said members.

Said projection 136 is carried by a small lever 139 (FIG. 26) keyed to the spindle 140 passing through the connecting block 142, and then through the plate 110; to said lever is keyed on the other side of the block another small lever 143 (FIG. 24) carrying the adjusting stud 144 to which is anchored one of the ends of the return spring 145, whereas the other end of said spring is secured at 145a to the plate 110, the operation of which consists in producing the closing of the diaphragm through overlapping of the two leaf members 134 as soon as the stress exerted by the releasing means opposing its action, ceases.

It should be remarked that the movement of the stud 144 being arranged eccentrically, allows the modification of the angular setting of the levers 141 and 143, and thereby permitting an accurate adjustment of the diaphragm for small openings (FIG. 24).

In order that the opening of the diaphragm may be controlled by the location of the hand 101, the adjusting stud 144 of the small lever 143 is fitted in an intermediate lever 141 (FIGS. 18 and 24), rocking around the point 140 and controlling several parts. Said intermediate lever 141 carries a stop 147 engaged by the tailpiece 148 of the releasing lever 149 urged into said position of engagement by a spring wound round its pivot 150 while the stress exerted by said spring is larger than that of the spring 145 urging the intermediate lever 141.

Said intermediate lever 141 carries also a projection 152 of which the head is fitted in a recess 146 formed in the adjusting blade 153, said head being controlled by the latter, in a manner such that the amplitude of the oscillations imparted to it and transmitted by it through the small lever 143 and the adjusting stud 144 to the small lever 139 controlling the movement of the members 134, is a function of the amplitude of oscillation of said blade 153 rocking around the axis 117. As a matter of fact when, at the beginning of its movement, the releasing lever 149 urges its tailpiece away from the stop 147, the return spring 145 draws the intermediate lever 141 in the direction of the arrow 154 and the projection 152 on said intermediate lever urges the end of the adjusting blade 153 towards the feeler hand 101 of the movable set of the galvanometer 102.

In the case of an excess of insufficient luminosity the oscillatory movement of the releasing lever 149 is locked by the end of the safety lever 155 oscillating around the point 156 and which is urged by a spring 157 against the stop 158 rigid with said releasing lever 149.

Said movement is controlled as follows: under the action of the spring 157, the opposite end of the safety lever 155 engages a projection 161 on the notched movable locking blade 116; but said projection 161 bears also against the periphery of the tailpiece of the adjusting blade 153; this results in that the presence of the tailpiece of said blade 153 for a position of normal luminosity opposes the rocking of the lever 155 in the direction of the arrow 162 and holds its opposite end 155a outside the path of the stop 158 on the releasing lever 149.

The operation of said arrangement is as follows:

Upon action on the releasing lever 149 in the direction of the arrow 163 at the beginning of operation, the tailpiece 148 is urged away from the stud 147 of the intermediate lever 141 so that the latter is now free to rock under the tractional stress of the spring 145. Upon rocking, the adjusting stud 144 for the lever 141 urges towards the feeler hand 101, the adjusting blade 153 which is pivotally secured to said lever through the projection 152. Simultaneously the tailpiece of the adjusting blade 153 recedes and allows the locking blade 116 to rock, the projection on which latter blade was in contact with the blade 153. When said rocking movement is limited by the presence of the feeler hand 101, the end 155a of the safety lever 155 lies no longer in the path of the stop 158 rigid with the releasing lever 149. In contradistinction the absence of the feeler hand 101 allows the adjusting and locking blades 153 and 116 to rock to a maximum extent under the action of the corresponding springs, the end 155a of the lever 155 moving into engagement with the stop 158 on the releasing lever 149 and preventing the taking of a view.

With such an automatic control system, the positioning of the movable secondary plate 114 is obtained through a shifting by the operator of the annulus defining emulsion sensitivity, which annulus is not illustrated. Said ring is in its turn and as already known in the art secured to the sensitivity defining annulus, but in a manner such that these annuli may be adjusted with reference to each other according to the sensitivity of the emulsion which has been selected.

Upon continuation of the rotation of the cam 131 (FIG. 24), the stationary hand 125 replaces the galvanometer hand 101, so as to cut out automatic adjustment and to allow manual adjustment and time exposure.

What I claim is:

1. A diaphragm for photographic and kinematographic apparatus comprising a plate, a pivot on said plate, two leaf members revolvably carried by said pivot to one side of the plate and forming between them the diaphragm opening, a stay extending through the plate and rigid with each leaf member, a tail-piece rigid with each stay and lying over the side of the plate opposed to said one side, a light controlled pivoting feeler hand extending between the two tail-pieces to define through engagement with the latter, the extent of opening between the two leaf members and springs urging the leaf members into their closed position.

2. A diaphragm for photographic and kinematographic apparatus comprising two pivoting leaf members forming between them the diaphragm opening, a tailpiece rigid with each leaf member, a light controlled pivoting feeler hand extending between the two tailpieces to define through engagement with the latter the extent of opening between the two leaf members, springs urging the leaf members into their closed position, a pivoting notched locking blade, means whereby the leaf members when inoperative hold said locking blade in position away from the path of the feeler hand and a spring urging said locking blade into engagement with the feeler hand before the engagement of the latter by the leaf member tailpieces to hold said feeler hand in its accurate light-defined position.

3. A diaphragm for photographic and kinematographic apparatus comprising two pivoting leaf members forming between them the diaphragm opening, a tailpiece rigid with each member, a light controlled pivoting feeler hand extending between the two tailpieces to define through engagement with the latter the extent of opening between the two leaf members, springs urging the leaf members into their closed position, a pivoting notched locking blade, a pivoting releasing lever holding the leaf members and the locking blade in their inoperative positions and adapted to release same upon complete depression, a further spring urging said locking blade into engagement with the feeler hand before the engagement of the latter by the leaf member tailpieces to hold said feeler hand in its accurate light-defined position and means rigid with the locking blade adapted, upon progression of the latter beyond the operative range of positions of the feeler hand corresponding to operative light condition to lock the releasing lever against complete depression.

4. A diaphragm for photographic and kinematographic apparatus comprising two pivoting leaf members forming between them the diaphragm opening, a tailpiece rigid with each leaf member, a light controlled pivoting feeler hand extending between the two tailpieces to define through engagement with the latter the extent of opening between the two leaf members, springs urging the leaf members into their closed position, a pivoting notched locking blade, a pivoting releasing lever holding the leaf members and the locking blade in their inoperative positions and adapted to release same upon complete depression and a spring urging said locking blade into engagement with the feeler hand before the engagement of the latter by the leaf member, tailpieces to hold said feeler hand in its accurate light-defined position and means rigid with the locking blade adapted, upon progression of the latter beyond the operative range of positions of the feeler hand corresponding to operative light conditions to lock the releasing lever against complete depression, a further manually adjustable feeler hand adapted to engage the locking blade and to prevent it from locking the releasing lever, an auxiliary finding hand rigid with the first-mentioned feeler hand adapted to show the operator that the latter lies in its operative range and means whereby operation of the manually adjustable feeler hand conceals the finding hand from view.

5. A diaphragm for photographic and kinematographic apparatus comprising a plate, a pivot on said plate, two leaf members revolvably carried by said pivot to one side of the plate and forming a stay extending through the plate and rigid with each leaf member, a tail-piece rigid with each stay and lying over the side of the plate opposed to said one side, a light controlled pivoting feeler hand extending between the two tailpieces to define through engagement with the latter, the extent of opening between the two leaf members, a galvanometer including a rotor subjected to the action of a light-defining current and controlling the feeler hand, a stator, a stop for the feeler hand carried by the latter, an angularly shiftable support for the stator, an angularly shiftable cam controlling said support, a further cam arranged eccentrically of the diaphragm and controlling said angularly shiftable cam and a scale of diaphragm openings carried by last-mentioned cam.

6. In a diaphragm as claimed in claim 1, the combination of a lever adapted to release the leaf members, a locking stop rigid with the releasing lever, an oscillating blade adapted to be released through operation of the releasing lever, elastic means urging said oscillating blade into a position for which the adjusting blade engages the feeler hand and to recede to allow the locking blade to abut against the feeler hand under the thrust of one end of the lever which is subjected to an antagonistic thrust urging its opposite end into the path of a locking stop.

References Cited in the file of this patent
FOREIGN PATENTS
1,193,034    France _____ Apr. 27, 1959